UNITED STATES PATENT OFFICE.

OSCAR LOISEAU, OF SCLAIGNEAUX, BELGIUM.

MANUFACTURE OF CARBONIC OXID.

987,147.  Specification of Letters Patent.  Patented Mar. 21, 1911.

No Drawing.  Application filed June 17, 1908. Serial No. 439,046.

*To all whom it may concern:*

Be it known that I, OSCAR LOISEAU, engineer, a subject of the King of Belgium, residing in Sclaigneaux, Province of Liege, Belgium, have invented certain new and useful Improvements in the Manufacture of Carbonic Oxid; and I do hereby declare the following to be a full, clear, and exact description of the invention, such as will enable others skilled in the art to which it appertains to make and use the same.

The present invention relates to a method of manufacture of carbon monoxid, in a practically pure state, not mixed with nitrogen, obtained directly at very high temperatures, the temperature capable of being regulated at will. This result is obtained by blowing a mixture of oxygen and carbonic acid over graphite, coke or incandescent anthracite. The carbonic acid (the proportion of which in the mixture varies with the temperature to be obtained) is transformed into carbon monoxid, which is added to that produced by the direct action of the oxygen upon the free carbon. It is obvious that if it is necessary to obtain the gas carbon monoxid at the highest temperature possible, it will suffice to reduce this proportion of carbonic acid to zero. Each of the gaseous constituents of the mixture of oxygen and carbonic acid may be produced by any one of the usual well known processes. The uses to which the gases thus produced may be put are very varied and all the reductions which are now obtained at the high temperatures produced by the electric arc may be carried out by the direct use of this gas. It is obvious that the apparatus in which the reactions which produce the said gas take place must be of materials suitable for the high temperatures employed. In certain cases the bodies to be reduced may be mixed directly with the carbon employed to generate the carbonic oxid in suchwise that the gas produced according to the present invention is utilized in the nascent state. There may be mentioned as an advantageous use of this gas the production of special steels such as tungsten, chromium and manganese steels, etc.; the reduction of all refractory oxids for the purpose of obtaining metals or alloys directly, such as the reduction of bauxite to obtain aluminium or its alloys the treatment of the various minerals known by the name of rare earths, etc. As many of the applications of the carbonic oxid thus generated yield as a final product the gas carbonic oxid in a less heated state, it is possible to re-heat to the desired temperature, all or a part of this carbonic oxid by blowing it in at the same time as the pure oxygen or the mixture of oxygen and carbonic acid. It goes without saying that if the oxid of carbon derived from reactions be thus utilized, it is necessary to take all the usual precautions to avoid explosions.

Claim :—

1. The method of manufacturing substantially pure carbon monoxid at very high and regulable temperatures for immediate use in reduction or smelting processes, which consists of passing approximately pure carbon dioxid and approximately pure oxygen over incandescent carbon, the temperature of the carbon monoxid produced being regulated and maintained at the desired point by regulating the proportion of the mixture of carbon dioxid and oxygen, substantially as described.

2. The method of manufacturing, heated, substantially pure carbon monoxid of very high and regulable temperatures for immediate use in reduction and smelting processes, which consists in passing approximately pure carbon dioxid and approximately pure oxygen with an admixture of carbon monoxid over incandescent carbon, the temperature of the carbon monoxid produced being regulated and maintained at the desired point by regulating the desired proportion of the mixture of carbon dioxid and oxygen substantially as described.

3. The method of manufacturing heated carbon monoxid obtained directly at very high and regulable temperatures for immediate use in reduction or smelting processes which consists of passing approximately pure carbon dioxid and approximately pure oxygen over incandescent carbon, the temperature of the carbon monoxid produced being regulated and maintained constant at the desired point by regulating the proportion of the mixture of carbon dioxid and oxygen substantially as described.

In testimony that I claim the foregoing as my invention, I have signed my presence of two subscribing witnesses

OSCAR LOIS...

Witnesses:
GEORGES VANDER HAEGHEN,
LEONARD LEVA.